(12) United States Patent
Lund et al.

(10) Patent No.: US 11,495,967 B2
(45) Date of Patent: Nov. 8, 2022

(54) CONTROL OF A WIND TURBINE POWER GENERATION SYSTEM FOR OPTIMISING DC LINK VOLTAGE

(71) Applicant: VESTAS WIND SYSTEMS A/S, Aarhus N (DK)

(72) Inventors: Torsten Lund, Fredericia (DK); Ciprian Biris, Hinnerup (DK); Kent Tange, Ry (DK); Duy Duc Doan, Tilst (DK); Gert Karmisholt Andersen, Hovedgård (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/278,208

(22) PCT Filed: Sep. 11, 2019

(86) PCT No.: PCT/DK2019/050267
§ 371 (c)(1),
(2) Date: Mar. 19, 2021

(87) PCT Pub. No.: WO2020/057704
PCT Pub. Date: Mar. 26, 2020

(65) Prior Publication Data
US 2021/0351589 A1 Nov. 11, 2021

(30) Foreign Application Priority Data
Sep. 19, 2018 (DK) .......................... PA 2018 70612

(51) Int. Cl.
*H02J 3/00* (2006.01)
*H02J 3/01* (2006.01)
*H02J 3/38* (2006.01)

(52) U.S. Cl.
CPC ................. *H02J 3/01* (2013.01); *H02J 3/381* (2013.01); *H02J 2300/28* (2020.01)

(58) Field of Classification Search
CPC .......... H02J 3/01; H02J 3/381; H02J 2300/28; Y02E 10/76; Y02E 40/40
See application file for complete search history.

(56) References Cited

U.S. PATENT DOCUMENTS

| 2010/0157632 A1 | 6/2010 | Batten et al. |
| 2011/0096579 A1 | 4/2011 | Klodowski et al. |

(Continued)

FOREIGN PATENT DOCUMENTS

| CN | 106208124 A | * 12/2016 |
| CN | 106374496 A | * 2/2017 |

(Continued)

OTHER PUBLICATIONS

Dawei Xiang, Chuandong Wang, and Yeke Liu, "Switching Frequency Dynamic Control for DFIG Wind Turbine performance Improvement Around Synchronous Speed," IEEE Transactions on Power Electronics, vol. 32, No. 9, Sep. 2017, 14 pages.

(Continued)

*Primary Examiner* — Julio C. Gonzalez
(74) *Attorney, Agent, or Firm* — Patterson + Sheridan, LLP

(57) ABSTRACT

This invention relates to a method of controlling at least one wind turbine of a plurality of wind turbines connected to an electrical grid at a predefined point in the electrical grid. The wind turbine comprises a DC link connecting a generator side converter to a line side converter, where the line side converter is controlled according to a modulation index requested by a power converter controller. The method comprises determining a harmonic frequency signal indicative of a harmonic frequency value at the predefined point in (Continued)

the electrical grid; determining a deviation between the harmonic frequency signal and a permissible harmonic frequency value; determining a permissible modulation index based on the deviation; comparing the permissible modulation index to the modulation index requested by the power converter controller; and, altering a DC link voltage set-point based on the comparison between the permissible modulation index and the requested modulation index.

16 Claims, 6 Drawing Sheets

(56) References Cited

U.S. PATENT DOCUMENTS

| | | |
|---|---|---|
| 2012/0161685 A1 | 6/2012 | Geyer et al. |
| 2012/0299305 A1 | 11/2012 | Brogan et al. |
| 2013/0163292 A1 | 6/2013 | Basic et al. |
| 2013/0207393 A1 | 8/2013 | Letas |
| 2014/0008912 A1 | 1/2014 | Gupta et al. |
| 2014/0307488 A1* | 10/2014 | Brogan ............ H02J 3/50 363/35 |
| 2015/0016162 A1 | 1/2015 | West |
| 2015/0333677 A1* | 11/2015 | Letas ............ F03D 9/255 290/44 |
| 2018/0131266 A1 | 5/2018 | Rohr et al. |

FOREIGN PATENT DOCUMENTS

| | | |
|---|---|---|
| EP | 2541721 A2 | 1/2013 |
| EP | 2793392 A1 | 10/2014 |
| WO | 2020057704 A1 | 3/2020 |

OTHER PUBLICATIONS

Y. Hu, Zhe Chen and H. Mckenzie, "Voltage Source Converters in Distrubuted Generalion Systems," IEEE, DRPT2008 Apr. 6-9, 2008, 6 pages.

Danish Patent, and Trademark Office First Technical Examination for Application No. PA 2018 70612 dated Mar. 25, 2019.

PCT Notification of Transmittal of the international Search Report and the Written Opinion of the International Searching Authority, or the Declaration for Application No. PCT/DK2019/050267 dated Nov. 25, 2019.

* cited by examiner

CONTROL OF A WIND TURBINE POWER GENERATION SYSTEM FOR OPTIMISING DC LINK VOLTAGE

FIELD OF THE INVENTION

This invention relates to controlling a wind turbine power generation system for optimising DC link voltage.

BACKGROUND

A power converter of a wind turbine power generation system provides an output power that must account for wind turbine operating parameters, electrical grid conditions, such as instantaneous demand, and the like. The output power is given by the product of the output current and voltage. The output current is limited by the thermal ratings of semiconductors and passive components of the power converter, and the output voltage is limited by insulation levels, the DC link voltage and the maximum modulation index that the power converter can operate with. It is, however, an advantage to operate with as low a DC link voltage as possible in order to minimise switching losses and the risk of damage to the semiconductors due to cosmic rays.

It is against this background that the invention has been devised.

STATEMENTS OF INVENTION

According to a first aspect of the invention, there is provided a method of controlling at least one wind turbine of a plurality of wind turbines connected to an electrical grid at a predefined point in the electrical grid, the wind turbine comprising a DC link connecting a generator side converter to a line side converter, the line side converter being controlled according to a modulation index requested by a power converter controller, the method comprising: determining a harmonic frequency signal indicative of a harmonic frequency value at the predefined point in the electrical grid; determining a deviation between the harmonic frequency signal and a permissible harmonic frequency value; determining a permissible modulation index based on the deviation; comparing the permissible modulation index to the modulation index requested by the power converter controller; and, altering a DC link voltage set-point based on the comparison between the permissible modulation index and the requested modulation index.

Preferably, the method further comprises measuring the harmonic frequency value at the predefined point in the electrical grid; and, determining an average of the measured harmonic frequency value, wherein the harmonic frequency signal is determined based on the average of the measured harmonic frequency value.

Preferably, the method further comprises determining a plurality of harmonic frequency signals based a plurality of averages of the measured harmonic frequency value, wherein each average of the plurality of averages is determined according to a different time period; and, comparing the plurality of harmonic frequency signals and the permissible harmonic frequency value to determine the deviation, the deviation being the maximum deviation between the plurality of harmonic frequency signals and the permissible harmonic frequency value.

Preferably, the different time periods correspond to the requirements of the electrical grid.

Preferably, the permissible modulation index is determined based on the deviation according to an inverse relationship.

Preferably, altering a DC link voltage set-point comprises: determining if the requested modulation index is greater or less than the permissible modulation index; and, on determining that the requested modulation index is greater than the permissible modulation index, increasing the DC link voltage set-point; or, on determining that the requested modulation index is less than the permissible modulation index, decreasing the DC link voltage set-point.

Preferably, the minimum voltage set-point for the DC link is based on the minimum voltages required by the generator and line side converters. Specifically, the minimum voltage set-point for the DC link will be the higher voltage of the minimum voltages required by the generator and line side converters.

Preferably, the method further comprises determining an optimised DC link voltage based on the DC link voltage set-point; determining if the DC link voltage set-point is greater or less than the optimised DC link voltage; and, on determining that the DC link voltage set-point is greater than the optimised DC link voltage, decreasing the AC voltage across the line side converter; or, on determining that the DC link voltage set-point of is less than the optimised DC link voltage, increasing the AC voltage across the line side converter.

Preferably, the AC voltage across the line side converter is increased or decreased by decreasing or increasing the turn ratio of a coupling transformer.

Preferably, the harmonic frequency value comprises current harmonics and/or voltage harmonics.

Preferably, the predefined point in the electrical grid is a point of common coupling.

Preferably, the maximum permissible modulation index value is within an overmodulation range.

According to a second aspect of the invention, there is provided a control system for controlling at least one wind turbine of a plurality of wind turbines connected to an electrical grid at a predefined point in the electrical grid, wherein the wind turbine comprises power generation system comprising a DC link connecting a generator side converter to a line side converter, and wherein the control system comprises a wind power plant controller operatively connected to the power generation system and a power converter controller for controlling the line side converter according to a modulation index, wherein the wind power plant controller is configured to determine a harmonic frequency signal indicative of a harmonic frequency value at the predefined point in the electrical grid; determine a deviation between the harmonic frequency signal and a permissible harmonic frequency value; and, determine a permissible modulation index based on the deviation, and wherein the power converter controller is configured to compare the permissible modulation index to a requested modulation index; and, alter a DC link voltage set-point based on the comparison between the permissible modulation index and the requested modulation index.

According to a third aspect of the invention, there is provided a computer program downloadable from a communication network and/or stored on a machine readable medium comprising program code instructions for implementing a method to the first aspect.

BRIEF DESCRIPTION OF DRAWINGS

The above and other aspects of the invention will now be described, by way of example only, with reference to the accompanying drawings, in which.

Figure 1:
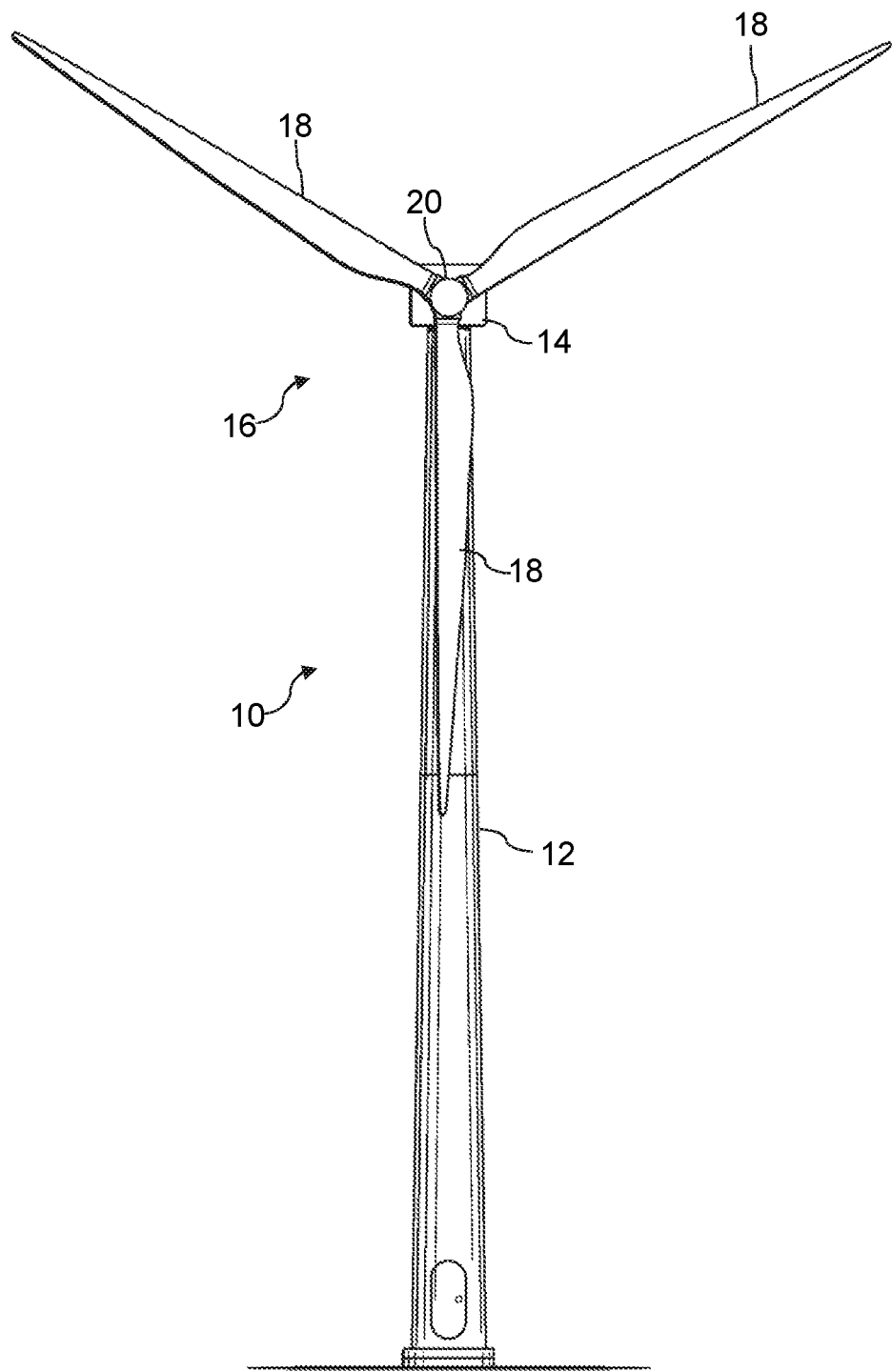
FIG. 1 is a schematic view of a wind turbine that is suitable for use with the invention.

In the drawings, like features are denoted by like reference signs.

SPECIFIC DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilised and structural, logical and electrical changes may be made without departing from the scope of the invention as defined in the appended claims.

To provide context for the invention, FIG. 1 shows a wind turbine, generally designated as 10, of the kind that may be used with embodiments of the invention. In this example, the wind turbine 10 is a three-bladed upwind horizontal-axis wind turbine, which is the most common type of wind turbine in use. The wind turbine 10 comprises a tower 12 supporting a nacelle 14 to which a rotor 16 is mounted. The rotor 16 comprises a plurality of rotor blades 18 extending radially from a central hub 20. In this example, the rotor 16 comprises three rotor blades 18, although it will be apparent to the skilled reader that other configurations are possible. The rotor 16 is operatively coupled to a generator (not shown in FIG. 1) housed inside the nacelle 14. The generator is arranged to be driven by the rotor 16 to produced electrical power. Thus, the wind turbine 10 is able to generate electrical power from a flow of wind passing through a swept area of the rotor 16, causing it to rotate. In addition to the generator, the nacelle 14 houses miscellaneous components required for converting wind energy into electrical energy, along with various other components needed to operate, control, and optimise the performance of the wind turbine 10. It should be noted that the wind turbine 10 of FIG. 1 is referred to by way of example only, and that it would be possible to implement embodiments of the invention into many different types of wind turbines and their associated systems.

Figure 2:
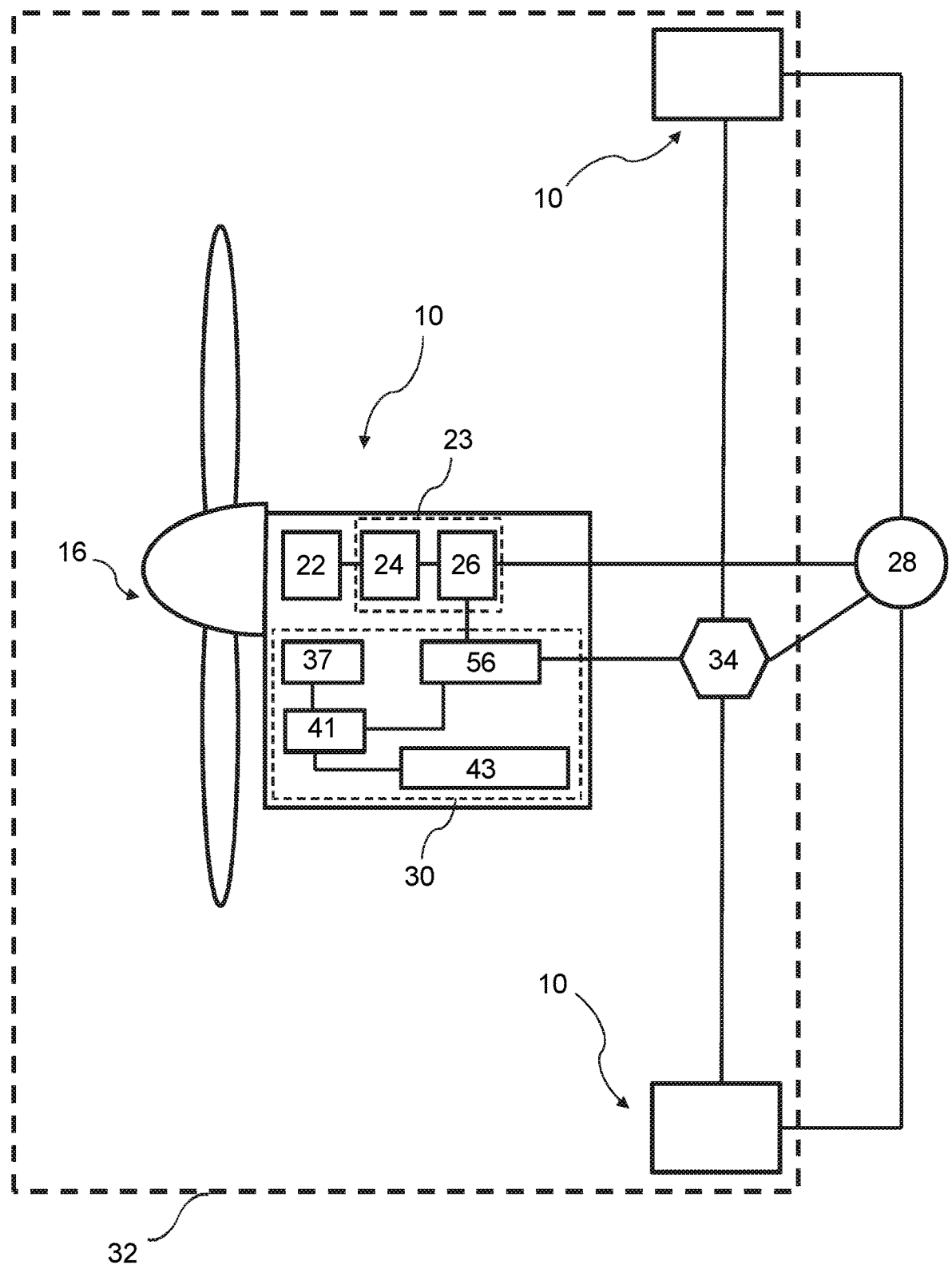
FIG. 2 is a schematic systems view of the wind turbine in FIG. 1, shown as forming part of a wind turbine power plant.

With reference to FIG. 2, which includes a schematic illustration of the wind turbine 10 at a systems level, the wind turbine 10 further comprises a gearbox 22 and a power generation system 23 comprising the generator 24 and a power converter system 26. The gearbox 22 gears up the rotational speed of the rotor 16 and drives the generator 24, which in turn feeds generated power to the power converter system 26. In the illustrated embodiment, the wind turbine 10 is operatively connected to a load, such as an electrical grid 28, such that the power output of the power converter system 26 can be transmitted to the electrical grid 28. The skilled reader would be aware that a suite of different power transmission options exist. The wind turbine 10 also includes a control means 30 comprising a power converter controller 56 for controlling the power converter system 26, along with a processor 41 configured to execute instructions that are stored in a read from a memory module 37 and/or an external data store. The control means 30 may also comprise a plurality of control units, generally designated by 43, in communication with the processor 41, for controlling the wind turbine 10 and performing a suite of safety and diagnostic monitoring functions, and carrying out corrective action if necessary.

Although the wind turbine 10 has been described individually up to this point, it would typically form part of a wind power plant 32 comprising a plurality of wind turbines, all of which are generally designated by 10 in FIG. 2. A wind power plant usually comprises a plurality of wind turbines positioned in the same general location. Although only three wind turbines 10 are shown in FIG. 2 as being part of the wind power plant 32, in some instances, a wind power plant may comprise several hundred wind turbines arranged over an area of several hundred square miles, and may be located onshore or offshore. As shown in FIG. 2, each wind turbine 10 in the wind power plant 32 is operatively connected to the electrical grid 28, at a predefined point in the electrical grid 28, so as to supply power to the electrical grid 28. The predefined point in the electrical grid 28 acts as a point of common coupling for at least a plurality of the wind turbines 10 defining the wind power plant 32. The power generation system 23 of each turbine 10 is operatively connected, via the power converter controller 56, to a wind power plant controller 34 configured to monitor collectively the operation of the power generation systems 23 and to issue a control signal to the power converter controller 56 to achieve a control objective.

Figure 3:
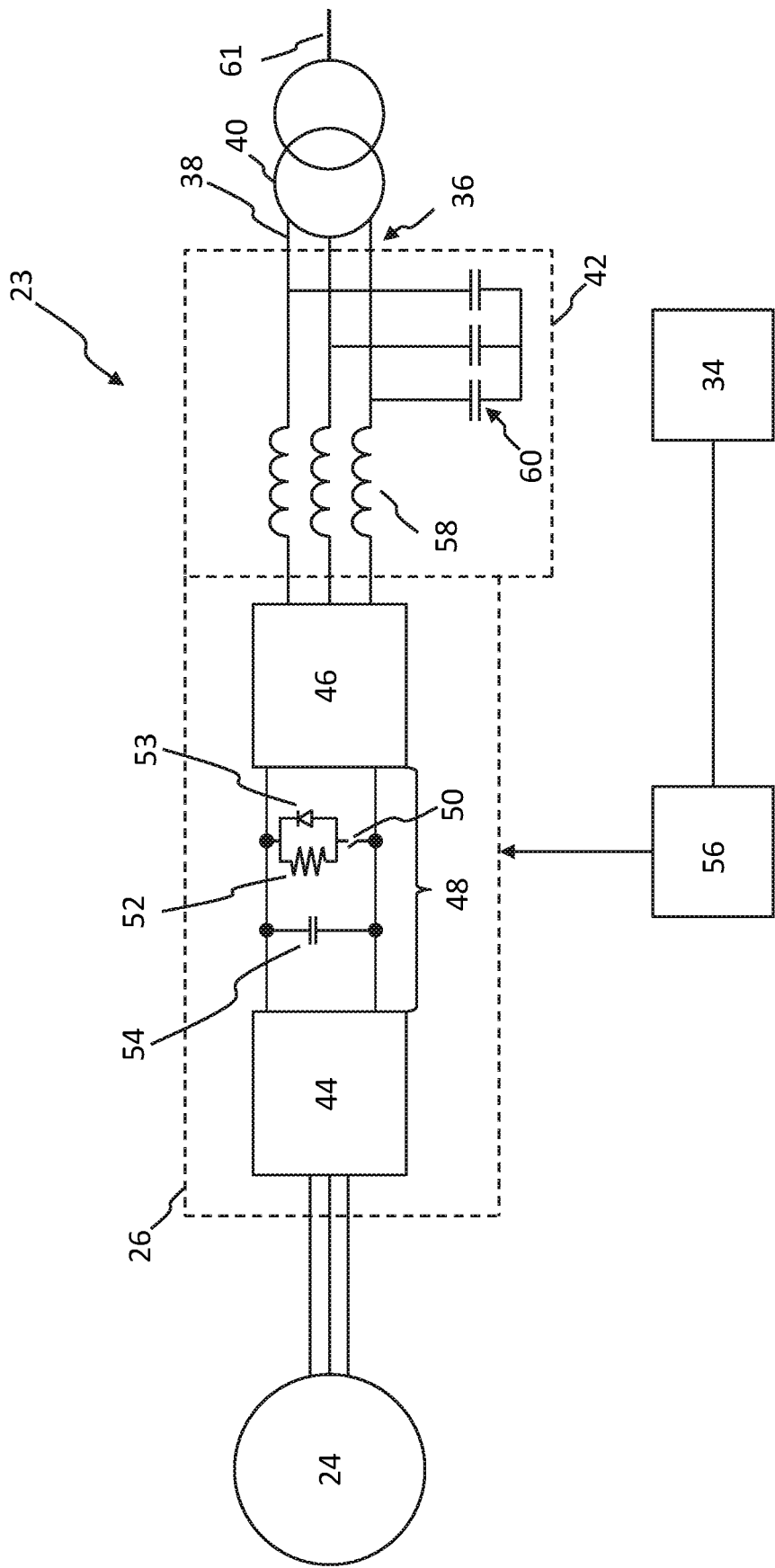
FIG. 3 is a schematic systems view of a power generation system for use in the wind turbine in FIG. 1.

FIG. 3 is a more detailed schematic overview of the power generation system 23 to which methods according to embodiments of the invention may be applied. The components of the power generation system 23 are conventional and, as such, familiar to the skilled reader, and so will only be described in overview. Moreover, it should be noted that the example of the power generation system 23 shown in FIG. 3 is representative only, and the skilled reader will appreciate that the methods described below may be applicable to many different configurations. For example, although the example is based on a full-scale converter architecture, in practice the invention may be used with other types of converters and in general terms the invention is suitable for use with all topologies, such as DFIG arrangements.

As already noted, the power generation system 23 comprises the generator 24, driven by the rotor 16 (not shown in FIG. 3) to produce electrical power, along with a low voltage link 36 defined by a bundle of conductor lines 38 terminating at a coupling transformer 40. The coupling transformer 40 acts as a terminal that connects the power generation system 23 to a grid transmission or distribution line (not shown) that, in turn, connects to the electrical grid 28. Thus, electrical power produced by the power generation system 23 is delivered to the electrical grid 28 through the coupling transformer 40.

As already noted, the power generation system 23 also includes the power converter system 26, together with a filter 42, disposed between the generator 24 and the coupling transformer 40, to process the output of the generator 24 into a suitable waveform having the same frequency as the electrical grid 28 and the appropriate phase angle.

The filter 42, which in this embodiment example comprises a respective inductor 58 with a respective shunted filter capacitor 60 for each of the conductor lines 38, provides low-pass filtering for removing switching harmonics from the AC waveform. The conductor lines 38 may also each include a respective circuit breaker (not shown) for managing faults within the power generation system 23.

As noted above, the low voltage link 36 terminates at the coupling transformer 40, which provides a required step-up in voltage. A high voltage output from the coupling transformer 40 defines a terminal 61, which acts to couple the power generation system 23 to the grid transmission line.

The power converter system 26 provides AC to AC conversion by feeding electrical current through a generator side converter 44 followed by a line side converter 46 in series for converting AC to DC and DC to AC respectively. The generator side converter 44 is connected to the line side converter 46 by a DC link 48. The DC link 48 comprises a plurality of switches, generally designated by 50, in series with respective resistors 52 and diodes 53 in a parallel arrangement, to act as a dump load to enable excess energy to be discharged, and a capacitor 54 providing smoothing for the DC output of the generator side converter 44. The smoothed DC output of the generator side converter 44 is received as a DC input by the line side converter 46, which creates a three-phase AC output for delivery to the coupling transformer 40.

Any suitable power converter system 26 may be used. In this embodiment, the generator side converter 44 and the line side converter 46 are defined by respective bridges of switching devices (not shown), for example in the configuration of a conventional two level back-to-back converter. Suitable switching devices for this purpose include integrated gate bipolar transistors (IGBTs) or metal-oxide-semiconductor field-effect transistors (MOSFETs). The switching devices are typically operated using pulse-width modulated drive signals, selected as a function of a modulation index, issued from a generator side current control module and a line side current control module (not shown), both of which form part of the power converter controller 56. The power converter controller 56 forms part of an overall control system that controls operation of the power converter system 26 in accordance with the invention.

The AC output leaves the power converter system 26 through the conductor lines 38, one carrying each phase. The output voltage of the line side converter 46 is limited by the available DC link voltage, and the ability of the line side converter 46 to output a given voltage, in view of the DC link voltage, is measured by the modulation index, which characterises the operation of the line side converter 46 as being in either a linear modulation range or a non-linear, overmodulation range. In the linear modulation range, the line side converter 46 can only output 90.6% of the maximum possible output voltage. If overmodulation is used, for example as a result of an overvoltage event in the electrical grid 28, the output voltage of the line side converter 46 can be increased beyond 906% up to the maximum possible output voltage, in which case the line side converter 46 is said to operate in six-step operation. The challenge of using the overmodulation range, in addition to the stability and saturation of the current control modules, is the high harmonic content generated by the power converter system 26.

Figure 4:
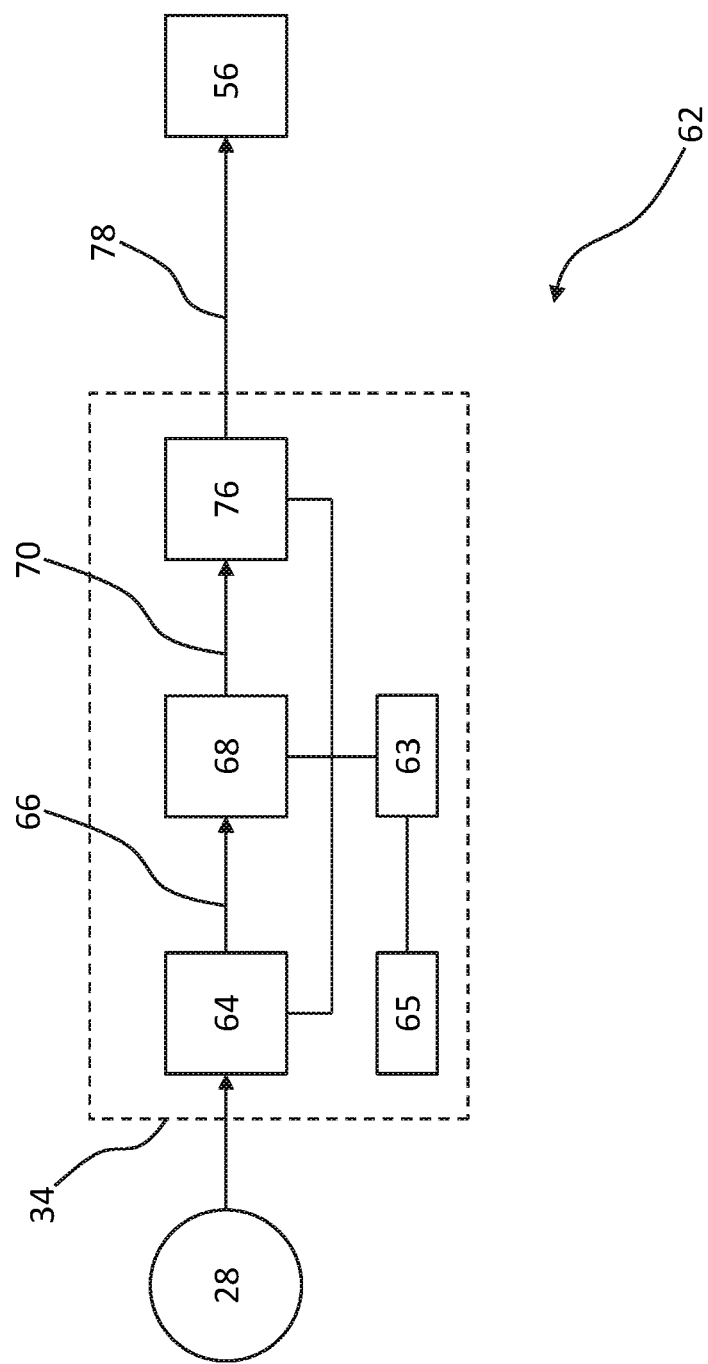
FIG. 4 is a schematic systems view of a control system according to an embodiment of the invention, comprising a wind power plant controller and a power converter controller.

FIG. 4 is schematic overview of a control system 62, comprising the wind power plant controller 34 and at least one power converter controller 56, configured to carry out a control strategy that, at a general level, includes monitoring the collectively output of wind turbines 10 defining the wind power plant 23 and, based on that output, issuing a control signal to the power converter systems 26 of individual wind turbines 10 to achieve a control objective.

More specifically, the wind power plant controller 34 is operable to output a permissible modulation index to the power converter controller 56 based on a harmonic frequency value indicative of harmonic frequency content determined at the predefined point in the electrical grid 28. The harmonic frequency value comprises current harmonics and/or voltage harmonics. The permissible modulation index is then compared against the modulation index requested by the line side current control module, and a DC link voltage set-point is altered according to the comparison. This enables the DC link voltage to be set as low as possible considering the modulation index requested by the line side current control module.

In order to achieve the control strategy, the wind power plant controller 34 is modularised in that it comprises a set of discrete modules, each providing a specific function. In this embodiment, those modules are implemented as individual software blocks within a common processing unit, but in other arrangements dedicated hardware blocks could be used. The modularised arrangement enhances integration with the wind power plant controller 34, in particular because it enables individual functions to be developed and upgraded without impacting other functions.

This embodiment of the wind power plant controller 34 comprises a processor 63 configured to execute instructions, according to the control strategy, that are stored in and read from a memory module 65. The wind power plant controller 34 further comprises a harmonic frequency module 64, operatively coupled to the electrical grid 28 so as to measure the harmonic frequency value at the predefined point in the electrical grid 28, and configured to generate and output a harmonic frequency signal 66 indicative of the harmonic frequency value. In an alternative embodiment, the harmonic frequency module 64 is configured to receive the harmonic frequency value from an external source, such as a transmission system operator responsible for the electrical grid 28 or wind power plant operator responsible for multiple wind turbines within a single wind power plant, for example.

The harmonic frequency signal 66 is then processed by a comparator module 68, which is operable to determine a deviation value between the harmonic frequency signal 66 and a permissible harmonic frequency value, and to generate and output a deviation signal 70 indicative of the deviation value. The permissible harmonic frequency value may be accessed by the wind power plant controller 34 from a representation of the harmonic frequency value versus the load conditions on the electrical grid 28. The representation may be stored in and accessed from the memory module 65 or may be accessed from an external data store.

Figure 5:
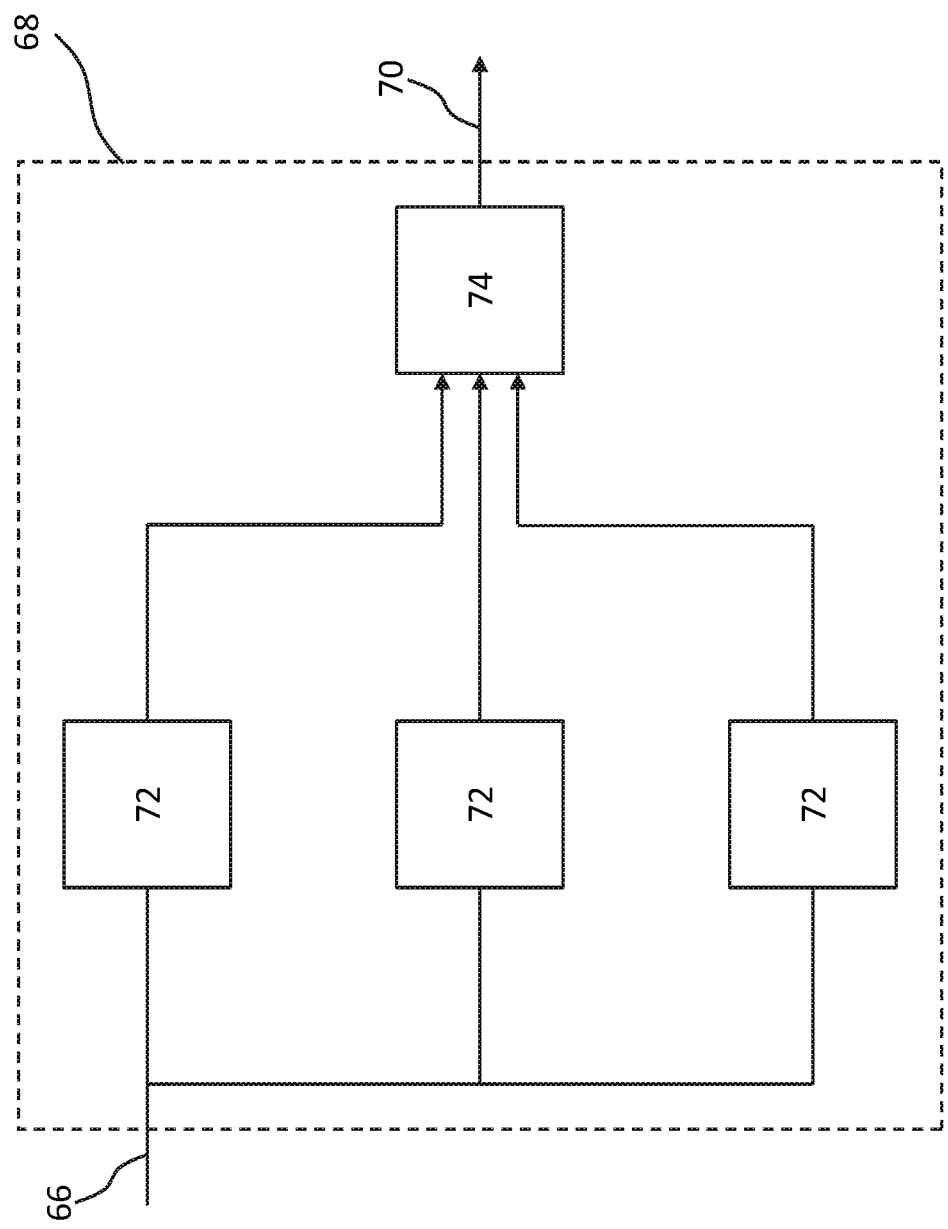
FIG. 5 is a schematic systems view of an embodiment of a comparator module for use in the wind power plant controller in FIG. 4; and, FIG. 6 is a schematic systems view of an embodiment of the power converter controller in FIG. 4.

With reference to FIG. 5, which illustrates is a more detailed schematic overview of an embodiment of the comparator module 68, the harmonic frequency signal 66 is processed, by the application of a plurality of filters 72 in a parallel arrangement, to determine averages of the harmonic frequency value. In this embodiment, the filters 72 are sliding average filters, each of which is operable to determine an average of the harmonic frequency value over a different time period, compared with the time period of the other filters 72. The time periods could vary between one second and 10 minutes, or over 10 minutes, and are selected according to the load requirements of the electrical grid 28. The filtered harmonic frequency signals 66 are then processed by a harmonic frequency comparator 74, which compares the filtered harmonic frequency signals 66 against a permissible harmonic frequency value to determine a deviation value between the filtered harmonic frequency signals 66 and the permissible harmonic frequency value, and generates the deviation signal 70 based on the deviation value.

In this example of the comparator module 68, three separate filtered harmonic frequency signals 66 are produced and are then compared, by the harmonic frequency comparator 74, against the permissible harmonic frequency value to produce three deviation values. In this case, which includes a plurality of deviation values, the deviation signal 70 is based on the maximum deviation value of the plurality of deviation values. However, it will be apparent to the skilled reader that the comparator module 68 could comprise more or fewer filters 72, resulting in more or fewer deviation values, and that in embodiments comprising a single filter 72, the deviation signal 70 would be based on a single deviation value.

Turning back to FIG. 4, the deviation signal 70 outputted from the comparator module 68 is then processed by a controller module 76, which is configured to determine a permissible modulation index based on the deviation signal 70 and to transmit a permissible modulation index signal 78, indicative of the permissible modulation index, to the individual power converter controllers 56 housed in the wind turbines 10. More specifically, the controller module 76 is configured to determine whether the deviation signal 70 indicates that the deviation value is positive or negative. On determining that the deviation value is positive or negative, the permissible modulation index is decreased or increased respectively.

Figure 6:
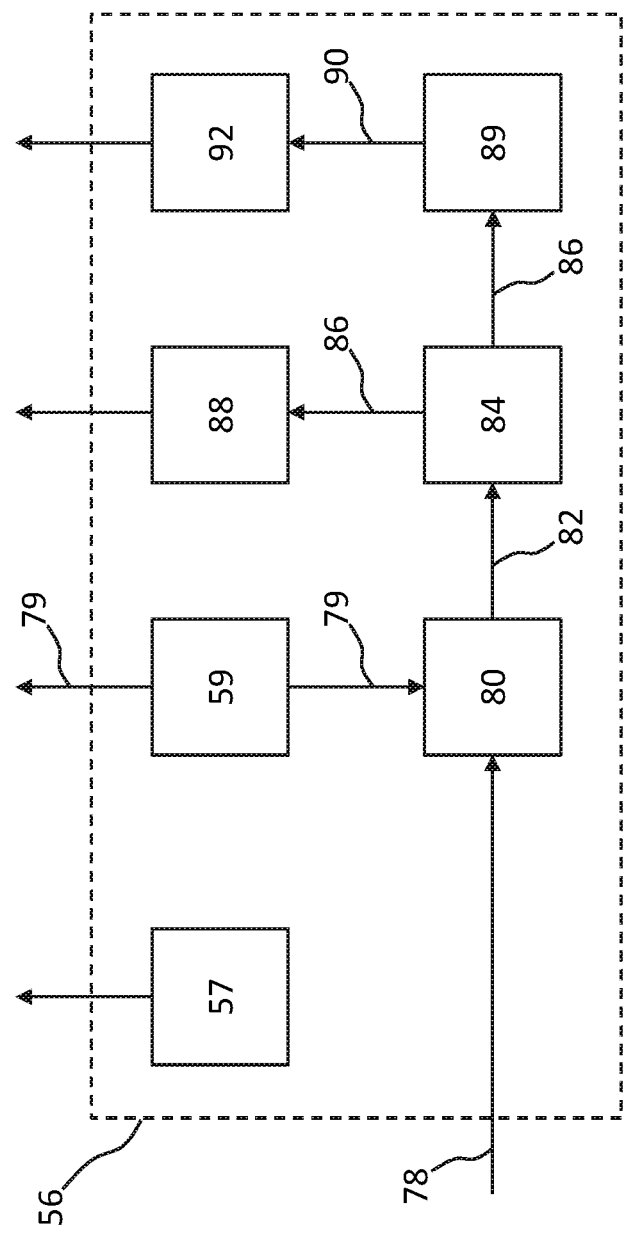

FIG. 6 is a more detailed schematic overview of the power converter controller 56, which, similar to the wind power plant controller 34, is modularised in that it comprises a set of discrete modules, each providing a specific function. As noted above, the power converter controller 56 comprises a grid side current control module 57 and a line side current control module 59 configured to issue drive signals to the switching devices of the power converter system 26 and, more generally, is operable to monitor the operation of the power converter system 26 and to issue commands thereto according to the control strategy.

On receiving the permissible modulation index signal 78, the power converter controller 56 is arranged to compare, using a modulation index comparator module 80, the permissible modulation index signal 78 to the modulation index, shown as a modulation index signal 79, requested by the line side current control module 59, and alter the DC link voltage set-point based on the comparison.

More specifically, the modulation index comparator module 80 is configured to determine whether the requested modulation index is greater or less than the permissible modulation index, and to generate a control signal 82 accordingly, which is processed by a DC voltage link set-point control module 84, If the control signal 82 indicates that the requested modulation index is greater or less than the permissible modulation index, the DC link voltage set-point control module 84 is operable to increase or decrease the DC link voltage set-point respectively, and to generate a DC link voltage set-point control signal 86 indicative of the DC link voltage set-point. The DC link voltage set-point control signal 86 is sent to a DC link voltage control module 88, which is operable to control the DC link voltage according to the DC link voltage set-point control signal 86.

The DC link voltage set-point control signal 86 can also be used to control the AC voltage of the line side converter 46. In general, the DC link voltage set-point is used to determine an optimised DC link voltage, which is compared to the DC link voltage set-point to determine whether it is greater or less than the DC link voltage set-point. If it is determined that the DC link voltage set-point is greater or less than the optimised DC link voltage, the AC voltage across the line side converter 46 is either decreased or increased respectively.

More specifically, if the power generation system 23 includes a transformer tap changer, the DC link voltage set-point control signal 86 is processed by a DC link voltage comparator module 89 operable to determine the optimised DC link voltage based on the DC link voltage set-point signal 86. This could be done by matching the DC link voltage set-point signal 86 to an offline calculated optimal DC link voltage value. The DC link voltage comparator module 89 then compares the DC link voltage set-point signal 86 to the optimised DC link voltage and outputs a tap changer control signal 90 for a tap changer control module 92. If the tap changer control signal 90 indicates that the DC link voltage set-point is greater than the optimised DC link voltage, the tap changer control module 92 issues a control signal to increase the turn ratio of the coupling transformer 40, thereby decreasing the voltage across the line side converter 46. Conversely, if the tap changer control signal 90 indicates that the DC link voltage set-point is less than the optimised DC link voltage, the tap changer control module 92 issues a control signal to decrease the turn ratio of the coupling transformer 40, thereby increasing the voltage across the line side converter 46.

This skilled reader will appreciate that modifications may be made to the specific embodiments described above without departing from the inventive concept as defined in the appended claims.

The invention claimed is:

1. A method of controlling at least one wind turbine of a plurality of wind turbines connected to an electrical grid at a predefined point in the electrical grid, the wind turbine comprising a DC link connecting a generator side converter to a line side converter, the line side converter being controlled according to a modulation index requested by a power converter controller, the method comprising:
   determining a plurality of harmonic frequency signals based on respective averages of a measured harmonic frequency value signal indicative of a harmonic frequency value at the predefined point in the electrical grid, wherein each average of the respective averages of the measured harmonic frequency value is determined according to a different time period;
   comparing the plurality of harmonic frequency signals and a permissible harmonic frequency value to determine a deviation between a harmonic frequency signal of the plurality of harmonic frequency signals and the permissible harmonic frequency value, the deviation being the maximum deviation between the plurality of harmonic frequency signals and the permissible harmonic frequency value;
   determining a permissible modulation index based on the deviation;
   comparing the permissible modulation index to the modulation index requested by the power converter controller; and altering a DC link voltage set-point based on comparing the permissible modulation index and the requested modulation index requested by the power converter controller.

2. The method of claim 1, wherein the different time periods correspond to the requirements of the electrical grid.

3. The method of claim 1, wherein the permissible modulation index is determined based on the deviation according to an inverse relationship.

4. The method of claim 1, wherein altering a DC link voltage set-point comprises:
determining if the modulation index requested by the power converter controller is greater or less than the permissible modulation index; and,
on determining that the modulation index requested by the power converter controller is greater than the permissible modulation index, increasing the DC link voltage set-point; or,
on determining that the modulation index requested by the power converter controller is less than the permissible modulation index, decreasing the DC link voltage set-point.

5. The method of claim 1, wherein the minimum voltage set-point for the DC link is based on the voltage required by the generator side converter and the line side converter.

6. The method of claim 1, further comprising:
determining an optimised DC link voltage based on the DC link voltage set-point;
determining if the DC link voltage set-point is greater or less than the optimised DC link voltage; and,
on determining that the DC link voltage set-point is greater than the optimised DC link voltage, decreasing an AC voltage across the line side converter; or,
on determining that the DC link voltage set-point of is less than the optimised DC link voltage, increasing the AC voltage across the line side converter.

7. The method of claim 6, wherein the AC voltage across the line side converter is increased or decreased by decreasing or increasing a turn ratio of a coupling transformer.

8. The method of claim 1, wherein the harmonic frequency value comprises current harmonics or voltage harmonics.

9. The method of claim 1, wherein the predefined point in the electrical grid is a point of common coupling.

10. The method of claim 1, wherein the maximum permissible modulation index value is within an overmodulation range.

11. A control system for controlling at least one wind turbine of a plurality of wind turbines connected to an electrical grid at a predefined point in the electrical grid, wherein the wind turbine comprises power generation system comprising a DC link connecting a generator side converter to a line side converter, and wherein the control system comprises a wind power plant controller operatively connected to the power generation system and a power converter controller for controlling the line side converter according to a modulation index, wherein the wind power plant controller is configured to:
determine a plurality of harmonic frequency signals based on respective averages of a measured harmonic frequency value indicative of a harmonic frequency value at the predefined point in the electrical grid, wherein each average of the respective averages of the measured harmonic frequency value is determined according to a different time period;
comparing the plurality of harmonic frequency signals and a permissible harmonic frequency value to determine a deviation between a harmonic frequency signal of the plurality of harmonic frequency signals and the permissible harmonic frequency value, the deviation being the maximum deviation between the plurality of harmonic frequency signals and the permissible harmonic frequency value; and
determine a permissible modulation index based on the deviation, and wherein the power converter controller is configured to:
compare the permissible modulation index to a requested modulation index; and
alter a DC link voltage set-point based on comparing the permissible modulation index and the requested modulation index.

12. A computer program downloadable from a communication network or stored on a machine readable medium comprising program code instructions for implementing an operation of controlling at least one wind turbine of a plurality of wind turbines connected to a predefined point in an electrical grid, the wind turbine comprising a DC link connecting a generator side converter to a line side converter, the line side converter being controlled according to a modulation index requested by a power converter controller, the operation comprising:
determining a plurality of harmonic frequency signals based on respective averages of a measured harmonic frequency value indicative of a harmonic frequency value at the predefined point in the electrical grid, wherein each average of the respective averages of the measured harmonic frequency value is determined according to a different time period;
comparing the plurality of harmonic frequency signals and a permissible harmonic frequency value to determine a deviation between a harmonic frequency signal of the plurality of harmonic frequency signals and the permissible harmonic frequency value, the deviation being the maximum deviation between the plurality of harmonic frequency signals and the permissible harmonic frequency value;
determining a permissible modulation index based on the deviation;
comparing the permissible modulation index to the modulation index requested by the power converter controller; and
altering a DC link voltage set-point based on comparing the permissible modulation index and the modulation index requested by the power converter controller.

13. The computer program of claim 12, wherein the different time periods correspond to the requirements of the electrical grid.

14. The computer program of claim 12, wherein the permissible modulation index is determined based on the deviation according to an inverse relationship.

15. The computer program of claim 12, wherein altering a DC link voltage set-point comprises:
determining whether the modulation index requested by the power converter controller is greater or less than the permissible modulation index; and
on determining that the modulation index requested by the power converter controller is greater than the permissible modulation index, increasing the DC link voltage set-point.

16. The computer program of claim 12, wherein altering a DC link voltage set-point comprises:
determining whether the modulation index requested by the power converter controller is greater or less than the permissible modulation index; and on determining that the modulation index requested by the power converter controller is less than the permissible modulation index, decreasing the DC link voltage set-point.

\* \* \* \* \*